United States Patent
Kaplan

(10) Patent No.: US 6,931,236 B2
(45) Date of Patent: Aug. 16, 2005

(54) PHONE MONITORING APPLIANCE

(75) Inventor: Diego Kaplan, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 679 days.

(21) Appl. No.: 09/990,538

(22) Filed: Nov. 21, 2001

(65) Prior Publication Data
US 2003/0096580 A1 May 22, 2003

(51) Int. Cl.[7] .............................................. H04M 1/00
(52) U.S. Cl. .......................... 455/67.11; 455/550.1; 455/564; 455/567
(58) Field of Search ................ 455/67.11, 67.12, 455/418, 419, 420, 404, 11.1, 9, 550.1, 564, 567; 340/573.1, 573.3, 539

(56) References Cited

U.S. PATENT DOCUMENTS

| | | | | |
|---|---|---|---|---|
| 4,571,455 A | * | 2/1986 | Labock et al. | 379/40 |
| 5,640,147 A | * | 6/1997 | Chek et al. | 340/573.4 |
| 5,651,070 A | * | 7/1997 | Blunt | 381/56 |
| 6,192,257 B1 | * | 2/2001 | Ray | 455/566 |
| 6,433,683 B1 | * | 8/2002 | Robinson | 340/540 |
| 2002/0021231 A1 | * | 2/2002 | Schlager et al. | 340/984 |
| 2002/0028696 A1 | * | 3/2002 | Hirayama et al. | 455/556 |

FOREIGN PATENT DOCUMENTS

JP 09016879 A * 1/1997 .......... G08B/25/08

* cited by examiner

*Primary Examiner*—Binh Tieu
*Assistant Examiner*—Tuan Pham

(57) ABSTRACT

Briefly, the mobile phone as a monitoring appliance allows a mobile phone to function as a remote-monitoring device. The mobile phone is turned on and left in the place to be monitored. After the mobile phone has a positive sound volume level comparison or a positive sound volume level comparison and a positive comparison to a target sound, the mobile phone places a telephone call to a predetermined telephone number and transmits the sound received by the microphone in the mobile phone.

8 Claims, 6 Drawing Sheets

PHONE MONITORING APPLIANCE

FIELD

The present invention relates generally to communications devices, and more particularly to mobile hand held communications devices.

BACKGROUND

A monitoring appliance is an electronic device which will enable a person to perceive activity from a remote location: For example, a baby monitor is a known monitoring appliance that allows sound from a baby's room to be transmitted to another location; such as another room in a house.

Current monitoring appliances are made up of two parts, a low power FM radio receiver portion and a low power FM radio transmitter portion. The radio transmitter is placed in a room to be monitored and the corresponding radio receiver is kept in close proximity to the monitoring person. Some newer monitoring appliances contain a transmitter and a receiver in both of the two parts to allow bi-directional communication.

Using a monitoring appliance that is a low power FM radio transmitter and receiver pair has several drawbacks. The range of the FM transmitter used in monitoring appliances is short, typically less than 0.25 mile. Current monitoring appliances can not be checked from a distance using a telephone. For this reason the monitoring person is required to remain close to the room that is being monitored. This greatly limits the value of the monitoring devices.

Additionally, since monitoring appliances typically only allow the selection of one of a few frequencies the monitoring appliance can easily interfere with other monitoring appliances in the area. Also, neighbors can receive the transmissions from a monitoring appliance transmitter with a radio scanner to eavesdrop on anything that is said in the room containing the monitoring appliance transmitter. The receiver used in a radio scanner is usually more sensitive than the receiver in a monitoring appliance. The radio scanner can typically pick up the transmission from much greater distances than the monitoring appliance. Accordingly, it would be beneficial to provide a monitoring device that could place a call to remote telephones.

SUMMARY

The object of the present invention is to provide an easy to use remote monitoring device. Briefly, a phone monitoring appliance allows a mobile phone to function as a remote-monitoring device. The mobile phone is set to detect external events and left in the place to be monitored. Responsive to a stimulus in the room, the phone monitoring appliance connects to a response center and transmits information indicative of the sound received by the microphone in the phone monitoring appliance.

In a specific example, a phone monitoring appliance with sound recognition can be programmed to detect specific sounds—e.g., baby crying or glass shattering. Thus, sound recognition functions can be used in conjunction with a triggering mechanism to enable the phone monitoring appliance to have a predetermined response to specific detected events.

Advantageously, the phone monitoring appliance enables intelligent monitoring to be accomplished over wide geographic ranges. Further, the phone monitoring appliance may be useful as a wireless communication phone when not used for monitoring.

BRIEF DESCRIPTION OF THE DRAWINGS AND TABLES

For a more complete understanding of the present invention and the advantages thereof, reference is now made to the following descriptions taken in conjunction with the accompanying drawings, in which.

Use of the same reference symbols in different figures indicates similar or identical items.

DETAILED DESCRIPTION

Figure 1:
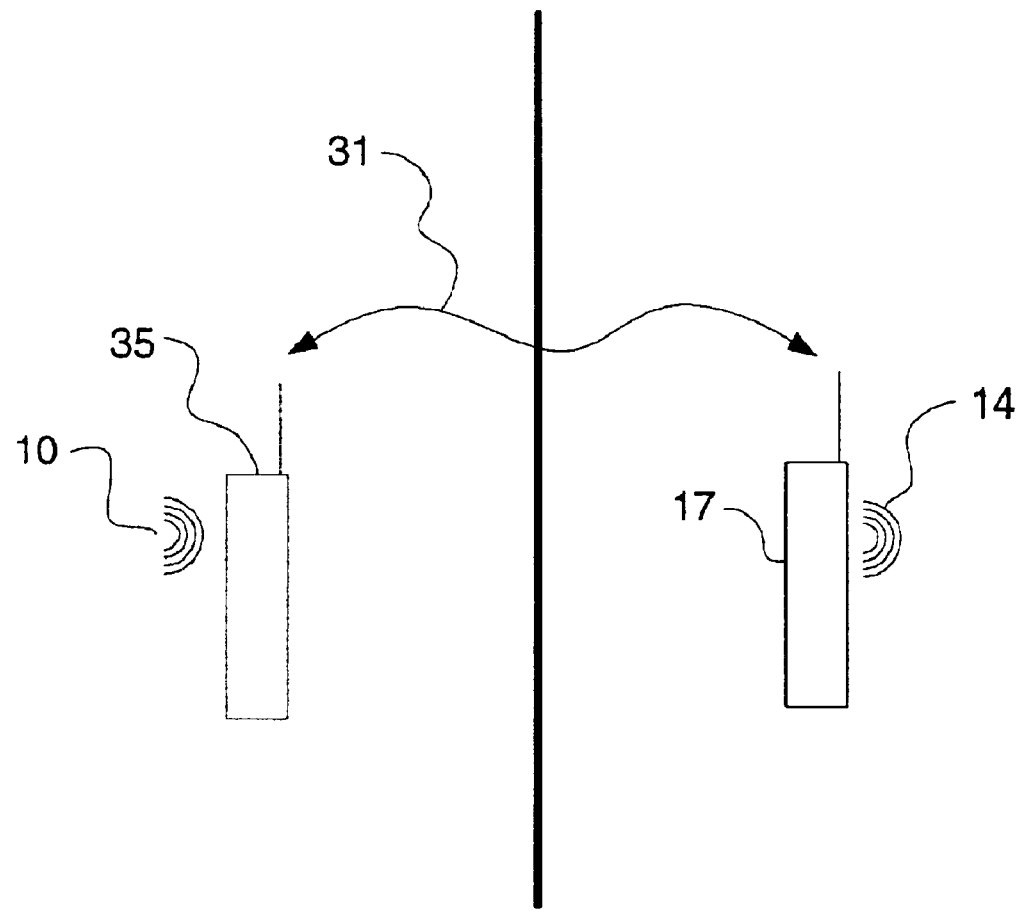
FIG. 1 is an illustration of a phone monitoring appliance in accordance with the present invention.

FIG. 1 shows one embodiment of the phone monitoring appliance 35 that has been left at a location to be monitored. In this embodiment ambient sound 10 is being monitored. The ambient sound 10 is occurring at the location and being monitored by the phone monitoring appliance 35. In response to a stimulus at the location the phone monitoring appliance 35 initiates a mobile call 31 to a mobile handset 17 and transmits information 14 indicative of the sound received by the microphone of the phone monitoring appliance 35. It will be clear to one skilled in the art that the mobile call 31 can be made to any type of response center, including landline telephone, not just mobile handsets. Additionally, the mobile call 31 can be any connection to the response center, not just a mobile telephone call.

In another embodiment the phone monitoring appliance 35 contains a camera and the mobile handset 17 contains a video monitor. The information 14 that is transmitted to the mobile handset 17 is video. An additional embodiment transmits both sound and video from the phone monitoring appliance 35 to the mobile handset 17.

Figure 2:
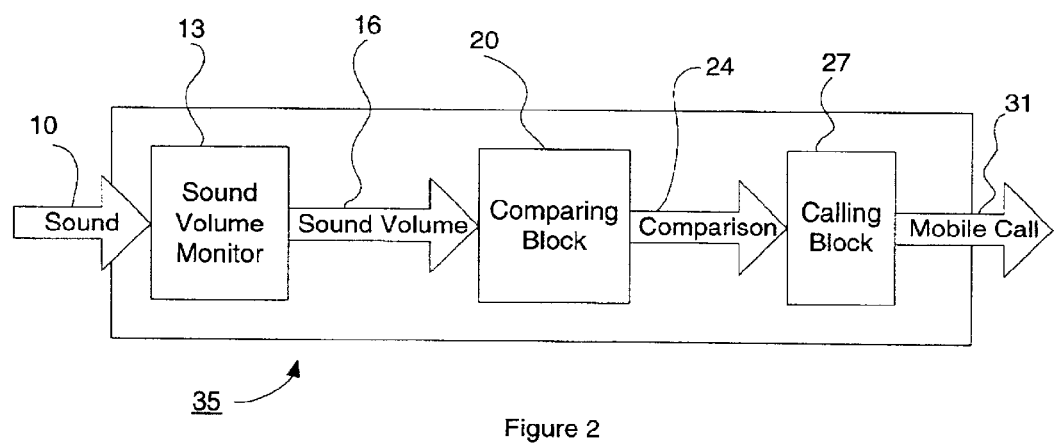
FIG. 2 is a block diagram of a sound comparison algorithm for the phone monitoring appliance.

Referring now to FIG. 2, a mobile handheld communication device 35 with a monitoring capability will now be described. The mobile handheld communication device 35 includes a stimulus monitor in the form of a sound volume monitor 13, a comparing block 20, and a calling block 27. The sound volume monitor 13 is configured to monitor ambient sound 10 and output a representation of sound volume 16 to the comparing block 20. The comparison block 20 outputs the results of a comparison of the sound volume 16 to a predetermined volume stored in the comparison block 20. Ambient sound 10 is defined here as any sound received by the microphone of the monitoring device. The result of the comparison 24 is output to the calling block 27. If a positive sound volume level comparison occurs a mobile call 31 is made. The mobile call 31 can transmit the ambient sound 10 that is currently occurring in the vicinity of the mobile handheld device 35. By using a mobile handheld communication device this way, a remote user can receive a call whenever the sound volume exceeds a predetermined volume. The remote user does not need to continually listen to the sound in the monitoring area. Alternatively, the mobile handheld communication device 35 can store the ambient sound 10 that triggered the mobile call 31 and transmit that event as described below.

It will be appreciated by one skilled in the art that the stimulus that the phone monitoring appliance 35 is used to detect could be a video signal. In another embodiment of the invention the phone monitoring appliance 35 monitors video instead of ambient sound 10. In this embodiment of the invention the stimulus monitor in the form of a video monitor. Video is monitored and the mobile call 31 is triggered by a predetermined event. The predetermined event may be, for example, movement, or some type of image recognition. In another embodiment ambient sound is used to trigger the phone monitoring appliance 35 and video is transmitted over the mobile call 31.

Figure 3:
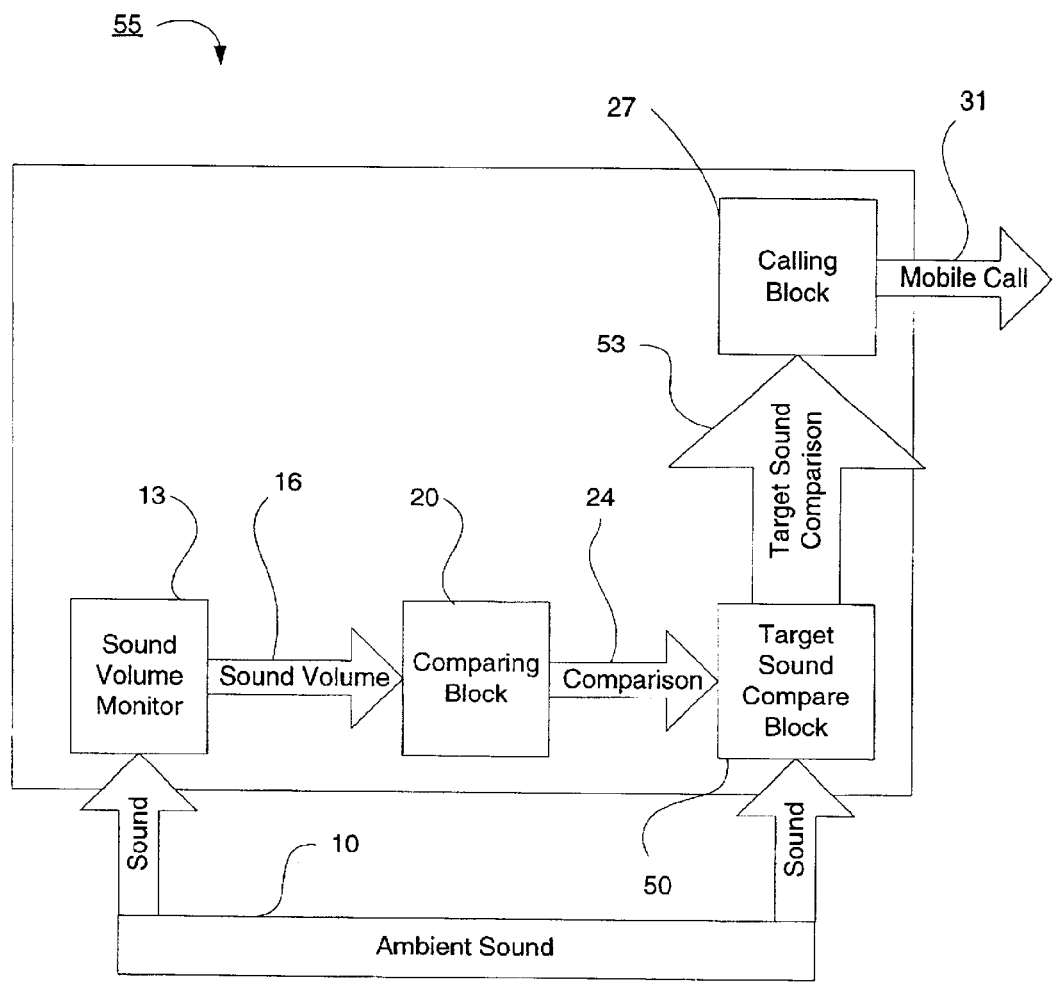
FIG. 3 is a block diagram showing a mobile wireless device with a target sound-comparing device.

Referring now to FIG. 3, a mobile handheld communications device with target sound compare block 55 will now be described. The target sound compare block 50 is an improvement over the mobile handheld communications device with target sound compare block 55 shown with respect to FIG. 2. The target sound compare block 50 allows the mobile handheld communications device with target sound compare block 55 to monitor for specific target sounds, such as, e.g., breaking glass or a baby crying. FIG. 3 is similar to FIG. 2. FIG. 3 includes a target sound compare block 50. The addition of a target sound compare block 50 gives the mobile handheld communications device with target sound compare device 5 voice recognition capability. If a positive sound volume level comparison occurs, then the target sound compare block 50 is enabled. If a negative comparison occurs, then the target sound compare block 50 is not enabled. The results of the target sound compare block 50 are output to the calling block 27. The calling block 27 is enabled when a positive target sound comparison 53 occurs. If the target sound comparison 53 is positive, the calling block 27 initiates a mobile call 31. The time while the target sound compare block is active is known as the target sound sensing period. Additional details of the target sound compare block 50 will be discussed in greater detail with reference to FIG. 4.

One skilled in the art will appreciate that the stimulus that the phone monitoring appliance 55 is used to detect could be a video signal. Video can be used to trigger the phone monitoring appliance 55 and video is transmitted over the mobile call 31.

Figure 4:
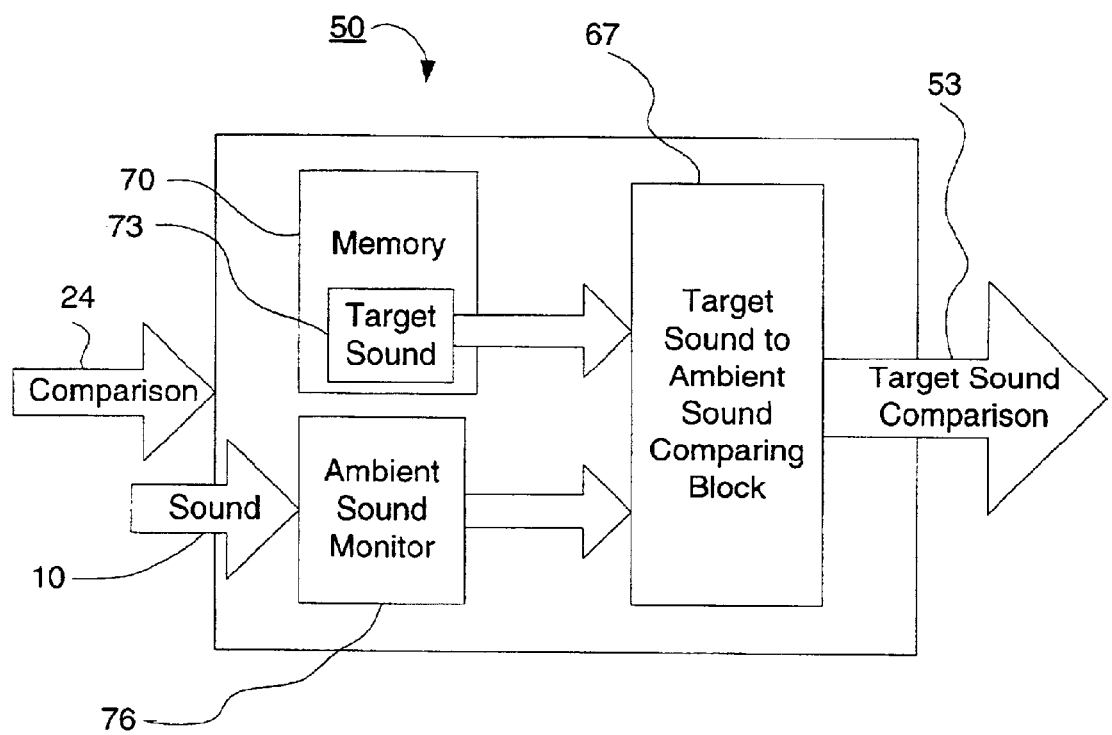
FIG. 4 is a block diagram showing additional details of the target sound-comparing device.

Referring now to FIG. 4, additional details of the target sound compare block 50 will now be discussed. The target sound compare block 50 is enabled by the comparison 24 from the comparison block 20 of FIG. 3. Once enabled the target sound compare block 50 will be active for a predetermined amount of time. While the target sound compare block 50 is enabled an ambient sound monitor 76 monitors ambient sound 10 and sends a representation of the ambient sound 10 to the target sound to ambient sound comparing device 67. The target sound to ambient sound comparing device 67 compares the input from the ambient sound monitor 76 and a target sound 73 stored in a memory 70. This comparison results in the target sound comparison 53 output of the target sound compare block 50. The target sound 73 must be previously stored in memory 70. The target sound 73 is the predetermined sound that a user wants to detect, such as, for example, glass breaking or a baby crying.

In one embodiment a digital representation of ambient sound 10 is stored to enable the transmission of the representation of the ambient sound that is within the search parameters of the target sound. The search parameter may include the volume level comparison of FIG. 2 or the volume level comparison of FIG. 3 and the target sound comparison of FIG. 3. Ambient sound satisfying the search parameters is defined here as a target sound event. One way to implement this feature would be to continually store the ambient sound. When an ambient sound memory (not shown) is full the oldest stored sound is overwritten with the current ambient sound. In this way the most recent ambient sound can always be stored and ready for transmission in case of a target sound event. When ambient sound that is within the search parameters of the target sound occurs, the target sound event, a mobile call 31 of FIGS. 2 and 3 is placed and the ambient sound 10 from the target sound event is transmitted.

Figure 5:
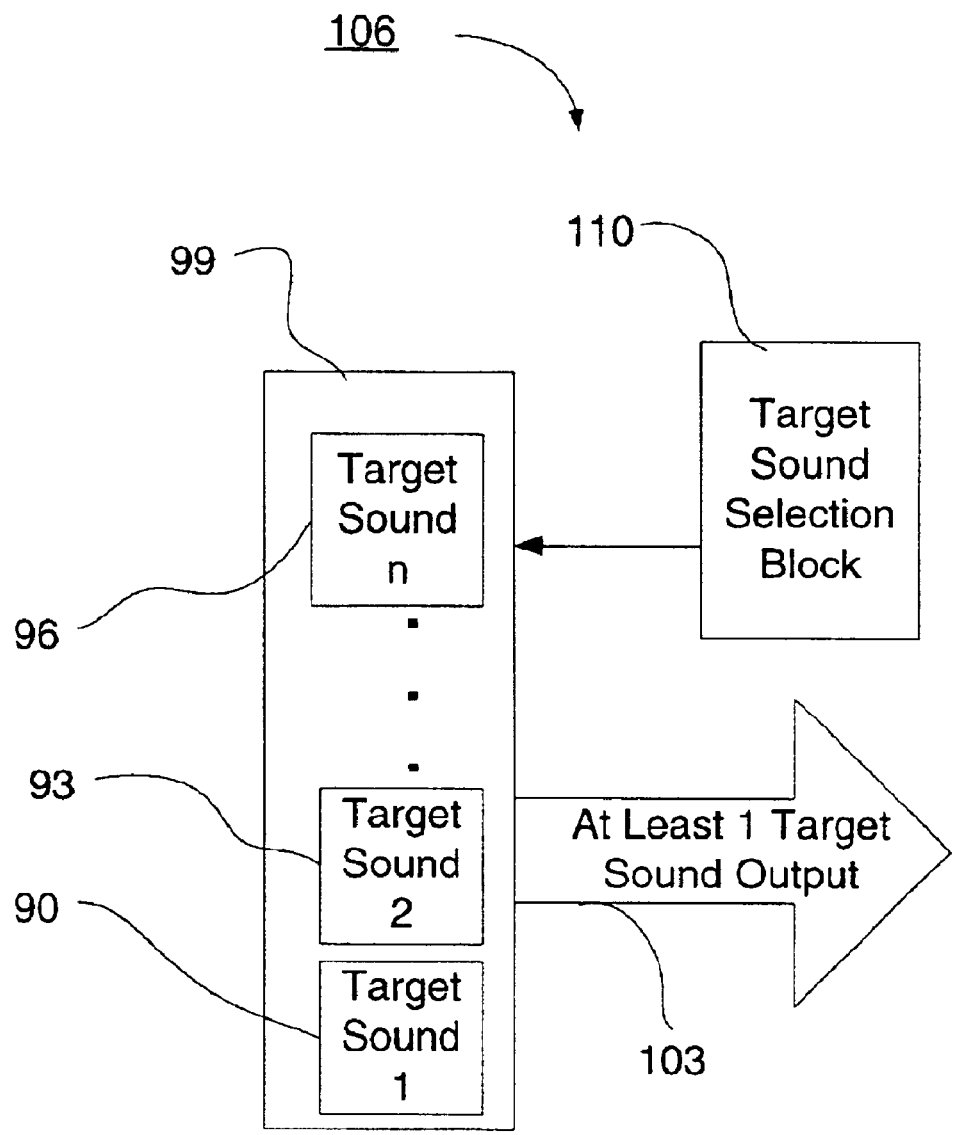
FIG. 5 is a block diagram showing memory adapted to store a plurality of target sounds and target sound selection circuitry.

Referring now to FIG. 5, additional details of the memory and target sound selection block 106 will now be described. It is possible to store a single target sound 90. Additionally, it is possible to store a plurality of target sounds 90, 93, 96. FIG. 5 contains a multiple target sound memory 99 capable of storing a plurality of target sounds 90, 93, 96 and target sound selection block 110 capable of selecting which of the plurality of target sounds to output from memory to the target sound to ambient sound comparing device 67. At least one target sound output 103 is necessary when the mobile communications device is being used to look for specific target sounds. However the mobile handheld communication device 35 may look for any number of the plurality of target sounds 90, 93, 96.

It will be appreciated that the various processes of this invention can be performed using hardware, software, or a combination of hardware and software.

Figure 6:
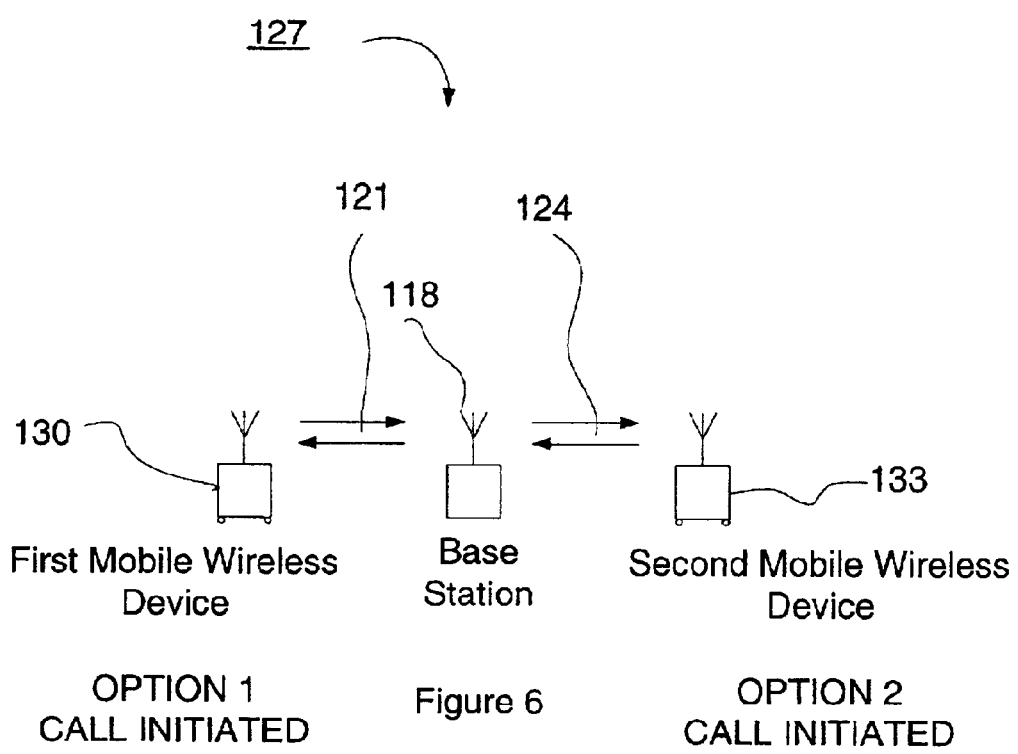
FIG. 6 is a diagram showing an example of a mobile call.

Referring now to FIG. 6, an example mobile call 127 shows additional details of the mobile call 31 of FIGS. 2 and 3. Option 1 in FIG. 6 shows a first mobile wireless device 130 making a call in response to a target sound event. The mobile wireless device 130 sends a full duplex radio frequency (RF) transmission 121 to a base station 118. The base station 118 then sends a second full duplex RF transmission 124 to a second mobile wireless device 133. It will be appreciated that the second RF transmission 124 to the second mobile wireless device 133 could be transmitted by a second base station that has two-way communications with the first base station 118. Additionally the second mobile wireless device could be replaced by a landline telephone.

Alternatively, a remote user can initiate a call to the monitoring device. In this way, the user can monitor the ambient sound at the monitoring device whether or not a target sound event has occurred. Option 2 in FIG. 6 shows that a mobile call can be made from the second mobile wireless device 133 to the first mobile wireless device 130 that is performing the phone monitoring appliance function. The user can call the first mobile wireless device 130 from the second mobile wireless device 133. The first mobile wireless device 130 will automatically pick up and transmit the ambient sound from the location being monitored. The mobile call detailed in Option 2 of FIG. 6 consists of full duplex radio frequency (RF) transmission 124 from the second mobile wireless device 133 to a base station 118. The base station 118 then sends a second full duplex RF transmission 124 to the first mobile wireless device 130. It will be appreciated that the call to the first mobile wireless device 130 could also be initiated from a telephone with a land line.

The time when the mobile handheld communication device 35 is acting as a monitoring device is known as monitoring mode. In the monitoring mode the sound volume monitor 13 and comparison block 20 are active. A period of time during which the mobile handheld communication device 35 is in the monitoring mode is known as a monitoring period. Additionally when a positive sound volume level comparison occurs, or when a positive sound volume comparison and a positive compare to a target sound occurs the calling block 27 will be active.

As an example, if the mobile handheld communication device 35 is placed in a vehicle and left powered on and in the monitoring mode the mobile handheld communication device 35 can be used as a vehicle alarm system. In one embodiment as shown in FIG. 2 the mobile handset monitors for an ambient sound 10 above a predetermined volume. If a person breaks into the vehicle by breaking the glass the sound volume monitor 13 will detect the glass shattering and send a representation of sound volume 16 to the comparing block 20. If the sound level is sufficient then the comparison 24 will activate the calling block 27 to initiate a mobile call 31. With the addition of the target sound compare block 50 as shown in FIG. 3 the mobile handset can monitor for a specific sound such as glass braking, so as to avoid false alarms caused by other loud noises.

The description and drawings contained herein are particular embodiments of the invention and are representative of the subject matter broadly contemplated by the invention. However, the invention encompasses other embodiments that will be apparent to those skilled in the art. Accordingly, the scope of the invention is limited only by the appended claims.

What is claimed is:

1. A mobile wireless communications device comprising:
    a sound volume monitor adapted to measure a sound volume level;
    a comparing block adapted to compare the sound volume level to a predetermined level for producing a volume level comparison;
    a target sound compare block adapted to compare a target sound to an ambient sound, responsive to the volume level comparison from the volume level comparing block;
    wherein the target sound compare block comprises:
        a memory storing the target sound;
        a target sound monitor adapted to receive an ambient sound;
        a target sound to ambient sound comparing block coupled to the memory and the target sound monitor for producing a target sound comparison; and
        a calling block adapted to initiate a mobile call responsive to the target sound comparison.

2. The mobile wireless device as in claim 1, wherein: the memory is configured to store a plurality of target sounds and a target sound selection block configured to select at least one of the event target sounds.

3. The mobile wireless device as in claim 1, wherein: the mobile call comprises a communication with a base station.

4. The mobile wireless device as in claim 1, wherein: the mobile call comprises: an RF transmission from the mobile wireless device; and a second mobile wireless device that receives the RF transmission of the first mobile wireless device.

5. A method of using a wireless communications device as a sound monitor comprising the steps of:
    providing a mobile wireless communication device comprising:
        a sound volume monitor adapted to output a representation of sound volume;
        a comparing block adapted to compare the representation of sound volume to a predetermined volume; and
        a target sound compare block comprising:
            a memory storing a target sound;
            an ambient sound monitor adapted to receive an ambient sound;
            a target sound to ambient sound comparing device coupled to the memory and the ambient sound monitor; and
            a calling circuit adapted to initiate a mobile call based on the target sound comparison of the target sound comparing device,
        wherein the target sound compare block is adapted to compare the ambient sound to the target sound after the predetermined threshold has been exceeded;
    recording a target sound; storing the target sound;
    comparing the sound level to a predetermined level during a monitoring period;
    initiating a target sound sensing period based on the positive target sound comparison of the comparing block;
    sensing a target sound event during the target sound sensing period;
    comparing the ambient sound to the target sound; and
    initiating a mobile call as a response to the target sound comparison.

6. The method of claim 5, wherein the comparing step is continuous during the monitoring period.

7. The method of claim 5, wherein the comparing step is continual during the monitoring period.

8. A mobile wireless communications device comprising:
    a stimulus monitor adapted to quantitatively measure a stimulus level;
    a comparing block adapted to compare the stimulus level measured to a predetermined stimulus level; and
    a target stimulus compare block adapted to qualitatively compare a target stimuli to a comparable ambient stimuli, responsive to the stimulus level comparison from the stimulus level comparing block;
    wherein the target stimulus compare block comprises:
        a memory storing descriptive parameters of at least one target stimuli;
        a target stimuli monitor adapted to receive an ambient stimuli;
        a target stimuli to ambient stimuli comparing block coupled to the memory and the target stimuli monitor for producing a target stimuli comparison; and
        a calling block adapted to initiate a mobile call responsive to the target stimuli comparison.

* * * * *